UNITED STATES PATENT OFFICE.

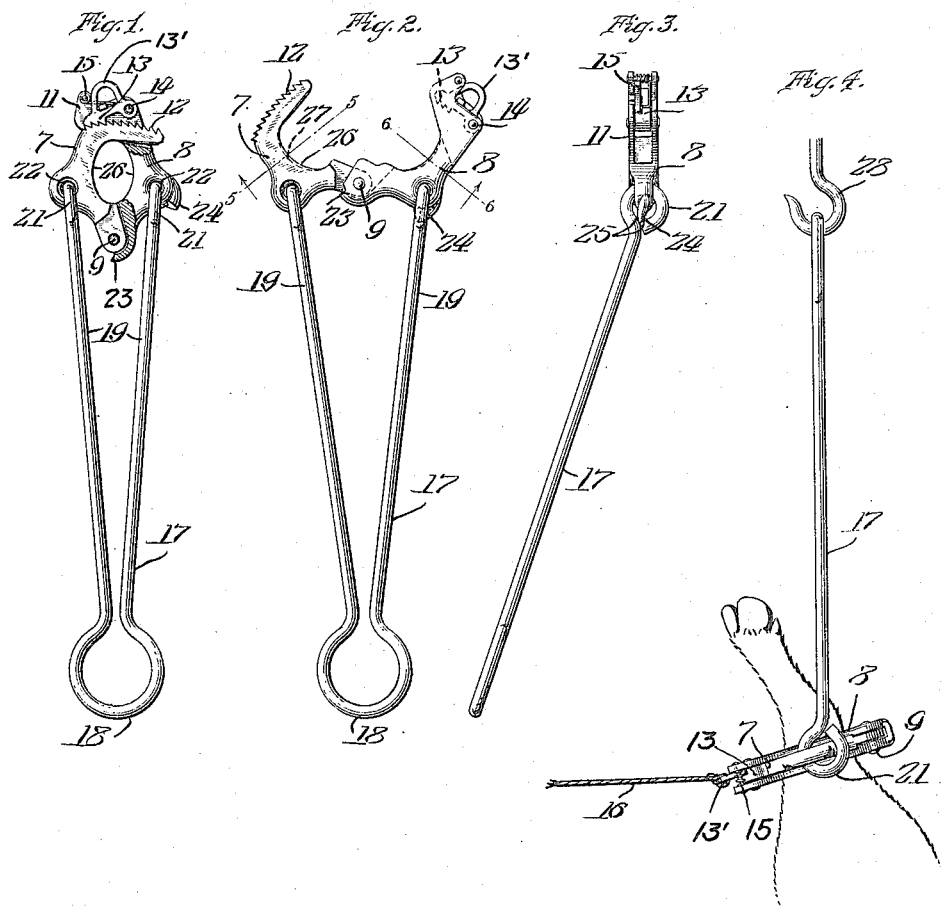

VICTOR WINQUIST, OF ROCKFORD, ILLINOIS, ASSIGNOR OF ONE-HALF TO ARVID RUDEEN, OF ROCKFORD, ILLINOIS.

CATCHING AND HOLDING DEVICE.

1,145,640.     Specification of Letters Patent.     Patented July 6, 1915.

Application filed May 9, 1914. Serial No. 837,542.

*To all whom it may concern:*

Be it known that I, VICTOR WINQUIST, a citizen of the United States, residing at Rockford, in the county of Winnebago and State of Illinois, have invented certain new and useful Improvements in Catching and Holding Devices, of which the following is a specification.

This invention relates to catching and holding devices, and to such as are particularly adapted for catching and holding animals.

One of the primary objects of my invention is the provision of an animal catching device wherein the catching jaws may be moved as a unit laterally relatively to a handle or shank portion to various angles, for the purpose of permitting the jaws to be properly positioned when catching an animal, and for permitting the catching device to be used as means for suspending the animal from an overhead support.

Another object of my invention is to provide a device which may be used both for catching an animal and for carrying the animal in a suspended position.

Another object is to provide a device of the above character which shall be easy to operate and thoroughly positive in its gripping action.

A further object is to provide a pair of pivoted catching jaws and improved means for moving the jaws to clamped or closed catching position.

Referring to the drawings: Figure 1 is a face view of my improved catching and holding device showing the jaws in closed position and portions of one of the jaws broken away. Fig. 2 is a similar view, but with the jaws locked in an open position. Fig. 3 is a side view of Fig. 2. Fig. 4 is a view illustrating the manner in which the catching device is used to carry an animal in a suspended position; and Figs. 5 and 6 are detail sectional views taken through the jaws on the line 5—5 and 6—6 respectively of Fig. 2.

The catching and holding device to which this invention relates is adapted for use in catching animals and particularly for catching hogs. Catching devices of this character are used generally for catching hogs preparatory to slaughtering them; and by my improved invention I provide means which are used not only in catching hogs, but for holding them suspended in the position for slaughtering. The advantages of such a device are readily apparent, as a hog can be placed in position to be slaughtered immediately after being caught, by using the catching device as the means of suspension.

The catching members of the device are in the form of a pair of jaws 7 and 8 pivotally connected at 9. The jaw 8 is formed with a bifurcated end 11 for the purpose of receiving between its sides the end of jaw 7, the outer side of which is provided with a ratchet face 12, and also for the purpose of providing a housing for a pawl 13 which is pivotally mounted upon a pin 14 interposed between the spaced sides of the end of the jaw 8. The pawl is adapted to yieldingly engage the ratchet face 12 when the jaws are in a closed position as shown in Fig. 1, the pawl being held in such engagement by a spring 15, and being provided with a loop 13' to which a rope or cable 16 is attached for the purpose of manually disengaging the pawl from the ratchet face.

A handle or shank means is attached to the jaws and is so arranged and constructed that it performs several functions; namely, that of a handle by which the device is carried and manipulated, a spring means for the purpose of forcing the jaws yieldingly together, a means by which the device may be suspended, and part of a means by which the jaws may be moved laterally relatively to the handle for purposes which will hereinafter be described. The handle, or shank, is formed of a spring metal length 17 bent upon itself so as to form an eye or loop end 18 and a pair of spaced arms 19. The end of each arm is shaped to form a hook 21, and each hook is passed through an aperture 22 formed in each jaw approximately medially between its ends, the axes of said apertures being parallel with the axis of the pivot pin 9. From the above description it will be seen that the jaws are flexibly connected to the handle or shank portion in such a manner that they may be moved as a unit, laterally relatively to the handle or shank portion.

The spring handle is so tensioned that upon swinging the jaws to an open position the spreading of the arms 19 by such movement will be against the tension retained in the loop end of the handle, and the arms will thereby exert a force upon the jaws tending to move them to a closed position. It is preferred that the stock of the handle be comparatively heavy in order that a strong force will be exerted upon the jaws tending to move them to their closed position. The pivoted end of the jaw 8 is provided with a stop 23 which will abut a portion of the jaw 7 when the jaws have been moved to an open position to such an extent that the pivot pin 9 has passed a slight distance beyond alinement of apertures 22, whereupon the spring force of the handle will effect locking of the jaws in this open position. The lock thus effected is virtually a toggle-lock.

When catching a hog it is desirable to carry the jaws in an open position in proximity to the ground and in a horizontal plane, without having the handle portion of the device similarly close to the ground. Therefore, I have provided means for locking the jaws when they are opened, in a position wherein the jaws form an obtuse angle with the handle, such as is shown in Fig. 3, whereby the jaws may be carried in proximity to the ground and in a substantially horizontal plane and the handle of the device will be disposed in an upwardly inclined position to facilitate manipulation of the device. This locking means comprises a lug 24 extending laterally from the jaw 8 adjacent its apertures 22 and being so shaped that when the jaws are closed it will not interfere with pivoting or swiveling of the jaws upon the hooks 21, but when the jaws are moved to an open position it will be moved intermediate the loop of the adjacent hook 21, and by abutting the V shaped inner sides 25 thereof will maintain the jaws locked at said obtuse angled position.

It is obvious that when the pivoted jaw portion of the device is moved forcibly into engagement with the lower portion of a hog's leg, preferably just above the lower joint, the force of such impact will move the center 9 retractingly past the alinement of apertures 22 and thus permit the spring tension of the handle to close the jaws in clamping engagement with the leg of the hog. It is obvious that the pawl 13 will automatically engage the rack face 12 and lock the jaws in their holding position.

The holding faces 26 of the jaws are formed concave transversely relatively to the length of the jaws as is clearly shown at 27 in Figs. 5 and 6, this being for the purpose of insuring positive gripping action of the jaws. I have found this form of holding face to be most preferable because of the fact that the skin of the hog being comparatively thick, the convex surface provides a means for receiving an uninterrupted ridge of skin, thereby insuring against slipping of the catching device from its engaged position.

When the hog has been caught by the device in the above described manner it may be suspended through means of the catching device for the purpose of slaughtering, and in Fig. 4 I have illustrated diagrammatically a hog suspended through means of the catching device. In this figure is shown a hook 28 which designates an overhead support with which the eye or loop end 18 of the handle is engaged to support the hog. It will be seen that with the hog suspended in this position, the jaws will swivel as a unit laterally relatively to the handle or shank portion to accommodate the position of the leg of the hog so as not to injure the same, and that the connection of the shank sides 19 with the jaws is so disposed on directly opposite sides of the engaged leg that a substantially vertically alined support is maintained between the means of support and the object supported.

I claim as my invention:

1. A catching device of the character described, comprising a pair of pivoted jaws, a handle or shank portion, means pivotally connecting the handle or shank portion with the jaws to permit the jaws to swing as a unit laterally relatively to the handle or shank portion, and means for automatically locking the jaws in a predetermined angled position with respect to the handle or shank portion upon the jaws being moved to their open position.

2. In a catching device of the character described, the combination of a pair of pivoted jaws, a shank or handle portion connected with the jaws in such manner that the same may be swung laterally to an angled position with respect thereto, and means for positively holding the jaws in said angled position only when the jaws are in open position and for automatically releasing the jaws from being held angled when the jaws are moved to closed position.

3. In a catching device of the character described, the combination of a pair of pivoted jaws, a shank or handle portion connected with the jaws in such manner that the same may be swung laterally to an angled position with respect thereto, and means for positively holding the jaws in an angled position only when the jaws are in an open position.

4. A catching device of the character described comprising a pair of pivoted jaws, handle means connected to the jaws in such manner that the same may swing laterally to an angled position with respect thereto, and means for locking the jaws in an angled position when they are open and for automatically releasing said lock when the jaws move to a closed position.

5. A catching device of the character described comprising a pair of pivoted jaws, each jaw having a transverse opening therethrough intermediate the ends thereof, a handle formed of a spring-metal section bent upon itself forming arms, the end of each arm being formed in a loop which passes through an opening in one of the jaws, whereby the jaws are pivotally connected to the arms of the handle and may be angled with respect thereto, the arms forming spring means urging the jaws to a closed position, and means carried by one of the jaws and being movable into and out of the loop connected therewith as the jaws are swung on their common pivot, to effect locking of the jaws from pivoting laterally with respect to the handle.

6. An animal-catching device comprising a handle or shank, catching means having jaws movable to open and closed positions, the catching means being so connected to one end of the handle or shank as to oscillate on an axis parallel with the plane in which the jaws move to open and closed positions, whereby the catching means may swing laterally on said axis to a position angled with respect to the handle or shank, and means for holding the catching means in a predetermined angled position when the jaws are open and for permitting the jaws to oscillate freely when they are closed.

VICTOR WINQUIST.

Witnesses:
JOHN F. McCANNA,
C. J. R. WILLIAMS.

Copies of this patent may be obtained for five cents each, by addressing the "Commissioner of Patents, Washington, D. C."